April 4, 1939.  R. C. RUSSELL  2,152,923
WHEEL BRAKE
Filed Nov. 27, 1936
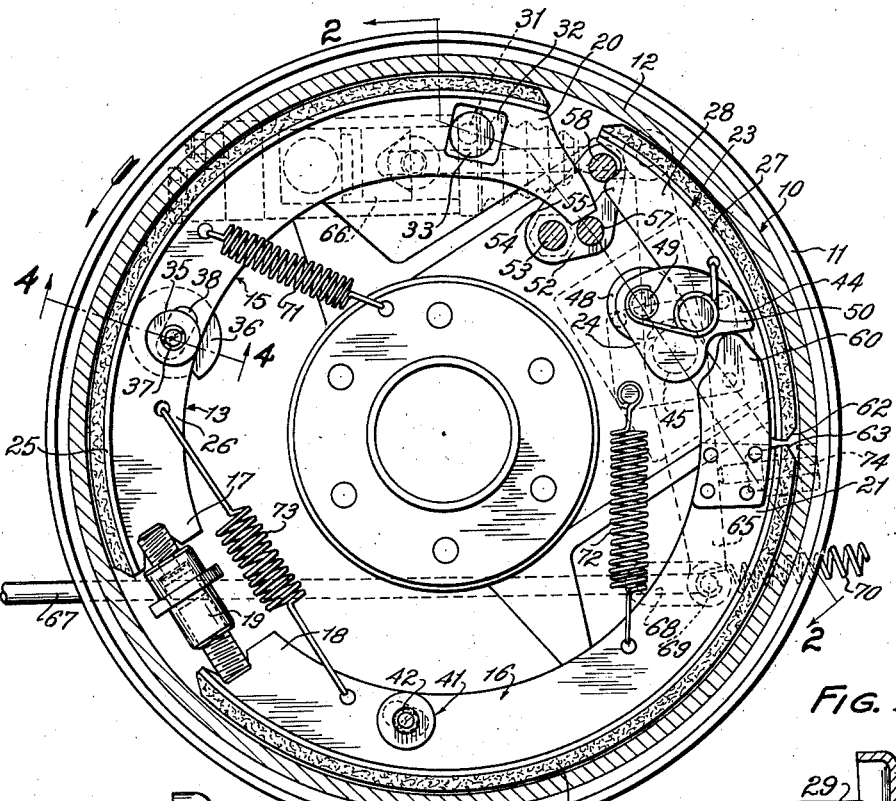
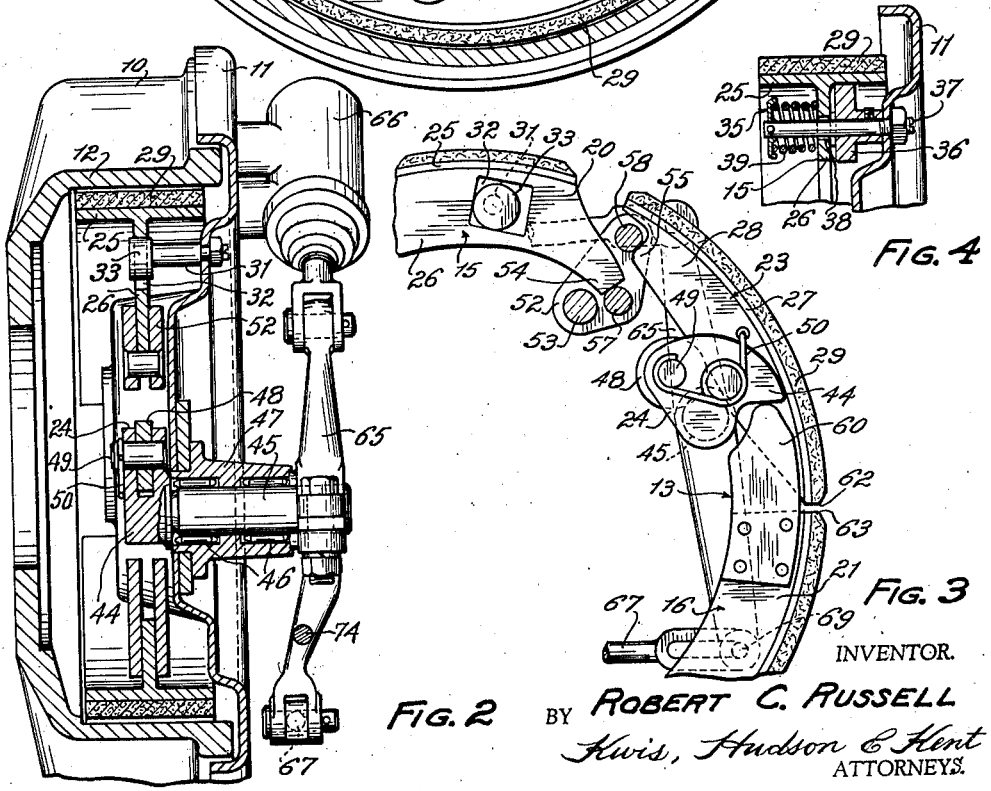
FIG. 1
FIG. 4
FIG. 3
FIG. 2
INVENTOR.
BY ROBERT C. RUSSELL
Kwis, Hudson & Kent
ATTORNEYS.

Patented Apr. 4, 1939

2,152,923

UNITED STATES PATENT OFFICE 2,152,923

WHEEL BRAKE

Robert C. Russell, Shaker Heights, Ohio, assignor to Eaton Manufacturing Company, Cleveland, Ohio, a corporation of Ohio Application November 27, 1936, Serial No. 113,013

5 Claims. (Cl. 188—78)

This invention relates to wheel brakes for motor vehicle and other uses, and more particularly to an improved brake of the internal expanding self-energizing type.

An object of my invention is to provide an improved brake having a friction device adapted to be applied by movement of an actuator shoe, and in which torque reaction from the braking operation acts in opposition to the driver-applied force.

Another object of my invention is to provide an improved internal expanding self-energizing brake having an actuator shoe for applying the friction device and in which the actuator shoe is operable to transmit force to one end of the friction device by direct engagement therewith upon rotation of the brake drum in one direction and through a novel lever arrangement to the other end of the friction device upon rotation of the drum in the opposite direction.

A further object of my invention is to provide an improved brake of the type having an actuator shoe adapted to be shifted by the brake drum to apply the friction device and in which novel means is provided for supporting and operating the actuator shoe.

Other objects and advantages of my invention will be apparent from the following description when taken in conjunction with the accompanying sheet of drawings in which Fig. 1 is a sectional elevation taken through a wheel brake embodying my invention.

Fig. 2 is a transverse sectional view taken through the brake as indicated by line 2—2 of Fig. 1.

Fig. 3 is a partial side elevation showing the actuator shoe and friction device in their relative positions but removed from the brake drum, and Fig. 4 is a partial sectional view taken through a shoe aligning and adjusting device as represented by line 4—4 of Fig. 1.

In the accompanying drawing I have illustrated one form of my improved brake in which my torque reacting feature and other novel features are embodied. It should be understood however that this particular embodiment of the invention is by way of illustration only and that the invention may be embodied in various other devices and constructions.

The brake illustrated in this instance is a wheel brake of the type which includes a rotatable drum 10 and a backing plate or support 11 disposed adjacent thereto so as to form a cover for the open side of the drum. The drum has a circumferentially extending flange 12 with the inner face of which a friction device 13 cooperates.

The friction device may comprise a pair of arcuate shoes 15 and 16 which have their adjacent ends 17 and 18 flexibly connected by an adjustable turnbuckle device 19 or the like, and have their opposite ends 20 and 21 in spaced relation to each other. An actuator shoe 23 is disposed between the ends 20 and 21 and is adapted to be shifted by the drum 10 to cooperate with one or the other of these ends for applying the friction device. The actuator shoe is carried by a driver-controlled actuating member 24 which is pivoted on the backing plate 11 and operates to press the actuator shoe against the drum.

The brake shoes 15 and 16 may be of any suitable construction, for example they may be of substantially T-shaped cross section in which the arcuately extending flange 25 forms the top of the T and the web 26 forms the stem of the T. The actuator shoe 23 may be of similar construction and may have an arcuate flange 27 which forms the top of the T-section and a web 28 which forms the stem of the T-section. Sections of brake lining 29 of suitable characteristic may be mounted on the shoes for frictional engagement with the annular drum surface.

The operating shoes 15 and 16 are loosely supported so as to be capable of limited shifting circumferentially of the drum surface with which they cooperate. An anchor 31 carried by the backing plate and extending into an opening 32 of the web of the shoe 15 limits the extent of this circumferential shifting. As indicated in Figs. 1 and 3 this anchor is located adjacent the end 20 of the shoe 15 and if desired may be made adjustable in form by providing a rotatable cam 33 as the contact part which engages the web of the shoe.

At a point between the anchor 31 and the connection 19 the shoe 15 may be provided with a combined aligning and adjusting device 35. This device includes a stop in the form of a rotatable cam 36 which is engaged by the flange 25 of the brake shoe to determine the initial spacing of the brake lining from the drum surface, and a bolt or pin 37 which is carried by the backing plate and extends through a slot-like opening 38 of the shoe web. The bolt 37 is mounted for rotation and has a drive connection with the cam 36 so that by rotation of the bolt the desired cam adjustment and corresponding lining spacing may be obtained. A compression spring 39 of suitable characteristic may be disposed around the stem of the bolt 37 to urge the shoe 16 toward the backing plate. The purpose of this spring is to prevent rattling and to assist in maintaining the shoe 15 in proper alignment with respect to the drum surface with which it cooperates.

The shoe 16 may also be provided with an aligning device 41 which is similar to the aligning device 35 of the shoe 15 except that it does not include a cam and the pin 42 need not be adjustable.

Reverting now to the actuator shoe 23 and the applying means therefor, I arrange this shoe to be carried by the actuating member 24 but with an operating connection therebetween which will permit relative shifting of the actuator shoe. For this purpose I construct the member 24 with a slotted head which forms a combined lever and cam 44 and which also serves as a holder for the actuator shoe. The member 24 is carried by, or formed as a part of, an operating shaft 45 which is rotatable in bearings 46 of a bracket 47 mounted on the backing plate 11. A roller 48 is disposed in the slot of the actuating member and is rotatable on the pivot pin 49 of the latter. The web portion 28 of the actuator shoe 23 engages in the slot and is held against the face of the roller 48 by means of a tension spring 50 which has its ends anchored respectively on the shoes and the pivot pin 49.

For transmitting motion to the friction device from the actuator shoe 23 when the latter is being shifted in a counter-clockwise direction by the drum as in ahead braking, I provide a lever 52 which is pivoted on the backing plate by means of the pivot pin 53 and which extends substantially radially outwardly adjacent the end 20 of the shoe 15. This lever is preferably of hollow or slotted construction so that portions or projections 54 and 55 of the web of the operating shoe 15 and the actuator shoe 23 may extend thereinto and engage respectively with cam surfaces or pins 57 and 58 of the lever. The shoe extension 54 is formed to lie inwardly of the portion or extension 55 of the actuator shoe and hence cooperates with the lever 52 at a shorter lever arm distance from the pivot pin 53 and the center of the brake drum than the actuator shoe.

With the lever arrangement just described it will be seen that when the actuator shoe 23 is pressed against the drum during ahead braking by a driver-controlled force applied through the actuating member 24, the actuator shoe will be carried in a counter-clockwise direction and force will be transmitted through the lever 52 to the shoe 15. This force acts on the shoe 15 in a direction to press the same against the drum surface thereby applying the friction device for the accomplishment of the desired braking action. By having the lever 52 pivoted on the backing plate and permitting sliding between the pin 58 and the portion 55 of the actuator shoe, it will be seen that there is no tendency for the actuator shoe to be pulled away from the drum surface while it is acting to apply the friction device.

One of the important features of my invention consists in the utilization of the torque reaction from the braking operation to oppose the driver-controlled force which is acting to apply or press the actuator shoe against the drum. Utilization of the torque reaction for this purpose affords the driver a much more positive and satisfactory control over the braking operation and, among other advantages, it serves as an automatic regulating means which prevents grabbing or locking even though the driver exerts or causes a sudden or excessive brake-applying force. To utilize the torque reacting feature I provide the end 21 of the brake shoe 16 with an extension, preferably in the form of spaced plate members 60 which receive the web portion of the actuator shoe therebetween and engage the cam and lever portion 44 of the actuating member 24. The cam and lever portion 44 of this member thus provides an abutment or anchor for the shoe end 21 and, when the operating shoes are pressed against the brake drum by the actuator shoe 23 during ahead braking, there is a tendency for both operating shoes to be carried along with the drum and a self-energizing effect is obtained. This circumferential shifting of the operating shoes causes torque reaction to be applied to the lever portion 44 of the actuator 24 in a direction to oppose the driver-controlled brake-applying force acting through the shaft 45.

During reverse braking the drum rotates in a clockwise direction and, when the actuator shoe 23 is pressed against the drum and shifted thereby, a shoulder 62 formed by the end of the actuator shoe engages a shoulder 63 formed by the end of the shoe 16. Movement transmitted to the shoe 16 after this engagement of the shoulders 62 and 63 presses the shoe against the drum and results in a desired self-energizing braking action by both of the operating shoes. Circumferential shifting of the shoes during reverse braking is limited by the anchor 31.

Any suitable means may be employed for moving the actuator 24 to press the shoe 23 against the brake drum. In this instance I show a lever 65 connected to the outer end of the shaft 45 and having arm portions extending in opposite directions therefrom. For ahead braking a rotative force may be applied to the upper arm of the lever 65 by means of any suitable driver-controlled means, such as a pedal, or the hydraulic device 66 shown in this instance. For emergency operation of the brake a rotative force acting in the same direction may be applied to the downwardly extending arm of the lever 65 by means of a rod or link 67 connected therewith. The connection between this link and the lever 65 is a lost motion connection, preferably formed by cooperating slot and pin elements 68 and 69 so that the emergency operating connection will not interfere with the service operating connection. The lever 65 and the actuator 24 may be normally urged toward the position thereof corresponding with the released condition of the brake by means of a suitable tension spring 70 acting on the pin element 69 of the emergency connection. The movement of the lever 65 and the actuator shoe toward released position may be limited or varied by an adjustable stop screw 74 carried on the backing plate and located at a point where it will be engaged by the downwardly extending arm of the lever.

The operating shoes 15 and 16 may also be normally urged toward their released position by tension springs 71 and 72 which act respectively on these shoes. In addition to urging the shoes toward released position the springs 71 and 72 also act to take up lost motion between the moving parts of the brake and prevent undesirable rattling. A tension spring 73 may also be connected between the shoes 15 and 16 to normally hold the shoe ends 17 and 18 in engagement with the slotted ends of the turnbuckle device 19.

From the foregoing description and the accompanying drawing it will now be readily understood that I have provided an improved brake of the internal expanding self-energizing type in which an actuator shoe is employed to apply the friction device and in which torque reaction from the braking operation acts in opposition to the driver-controlled force acting to apply the actuator shoe. It will also be understood that I have provided an improved wheel brake in which an actuator shoe is arranged to directly engage one end of a friction device upon rotation of the brake drum in one direction and to act upon the other end of the friction device through a novel lever arrangement upon rotation of the drum in the opposite direction. It will also be seen that, among the numerous advantages obtained in my improved brake, the novel means which I have provided for supporting and operating the actuator shoe enables this shoe to shift freely with the drum without tendency for it to be pulled away from the drum surface.

While I have illustrated and described my improved brake in a somewhat detailed manner, it should be understood that I do not wish to be limited to the precise details of construction and arrangements disclosed, but regard my invention as including such changes and modifications as do not constitute a departure from the spirit of the invention and the scope of the appended claims.

Having thus described my invention, I claim:

1. In a brake the combination of a rotatable drum, a friction device for cooperation with a surface thereof, an actuator shoe engageable with the drum and adapted upon rotation of the drum in either direction to be shifted thereby to act on the friction device to apply the same, driver-operated means for applying the actuator shoe, and means whereby torque reaction from the braking operation in one direction of drum rotation opposes the driver-operated means.

2. In a brake the combination of a rotatable drum, a friction device extending circumferentially of the drum for cooperation with a surface thereof and having spaced ends, an anchor cooperating with one of said ends to permit limited circumferential shifting of the friction device, an actuator shoe disposed between said ends and shiftable by the drum, driver-controlled means providing a stop for the other of said ends and operable to press the actuator shoe against the drum, said shoe being adapted for direct engagement with said other end of the friction device upon rotation of the drum in one direction, and lever means for transmitting brake applying force to said one end of the friction device upon rotation of the drum in the opposite direction.

3. In combination, a rotatable brake drum, a friction device supported adjacent a surface of the drum for limited shifting circumferentially and having spaced ends, an actuator shoe disposed between said ends and adapted to be shifted by the drum, means for transmitting force to said ends for applying the friction device in response to shifting of the actuator shoe in accordance with drum rotation in either direction, and a driver-controlled actuating member operable to press the actuator shoe against the drum, said actuating member being engaged by one end of the friction device whereby circumferential shifting of the latter causes torque reaction to be applied to the actuating member in opposition to the force acting to press the actuator shoe against the drum.

4. In combination, a rotatable brake drum, a pair of shoes cooperating with the drum with their ends in adjacent relation and having substantially aligned web portions, one of said shoes being an operating shoe and the other being an actuator shoe adapted to be shifted by the drum, and a lever disposed to transmit force from the actuator shoe to the operating shoe and having an opening into which said aligned web portions extend.

5. In combination, a rotatable brake drum, a support adjacent the drum, an actuating member pivoted on said support and having a slotted arm portion, a brake shoe carried by the actuating member and having a web portion engaging in the slot of said arm portion, means on the actuating member engaging said web portion for pressing the shoe against the drum, and a spring acting on said shoe and said arm portion to retain said web portion in engagement with said means of the actuating member.

ROBERT C. RUSSELL.